Figure 1:
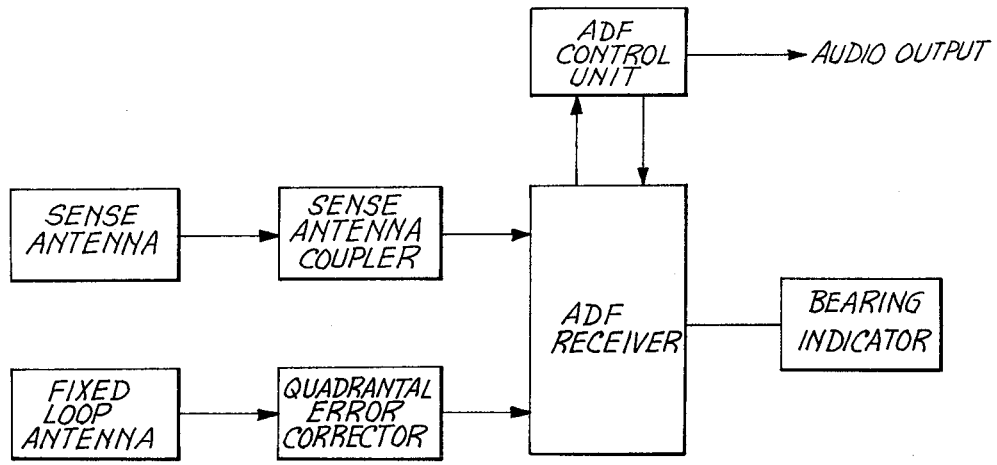

United States Patent
Layton

[15] 3,671,970
[45] June 20, 1972

[54] SWITCHED RHOMBIC AUTOMATIC DIRECTION FINDING ANTENNA SYSTEM AND APPARATUS

[72] Inventor: John E. Layton, Seattle, Wash.
[73] Assignee: The Boeing Company, Seattle, Wash.
[22] Filed: Aug. 31, 1970
[21] Appl. No.: 68,300

[52] U.S. Cl. ........................343/120, 343/739, 343/742, 343/744, 343/788, 343/895
[51] Int. Cl. ........................................C01s 5/04
[58] Field of Search ..................343/120, 733, 787, 854

[56] References Cited

UNITED STATES PATENTS

| 3,064,256 | 11/1962 | Sirons | 343/120 |
| 2,410,657 | 11/1946 | Hershberger | 343/854 |
| 3,440,542 | 4/1969 | Gautney | 343/788 |

Primary Examiner—Eli Lieberman
Attorney—Glenn Orlob, Kenneth W. Thomas and Conrad O. Gardner

[57] ABSTRACT

An antenna system which includes a four-element structure composed of inductances wound on high Q ferrite material and arranged in the form of a rhombus in combination with switching and tuning circuits provides both the bi-phase and constant phase signals required for automatic direction finding (ADF) equipment, thus eliminating the sense antenna requirement in these systems.

8 Claims, 5 Drawing Figures

INVENTOR.
JOHN E. LAYTON
BY
Conrad O. Gardner
ATTORNEY

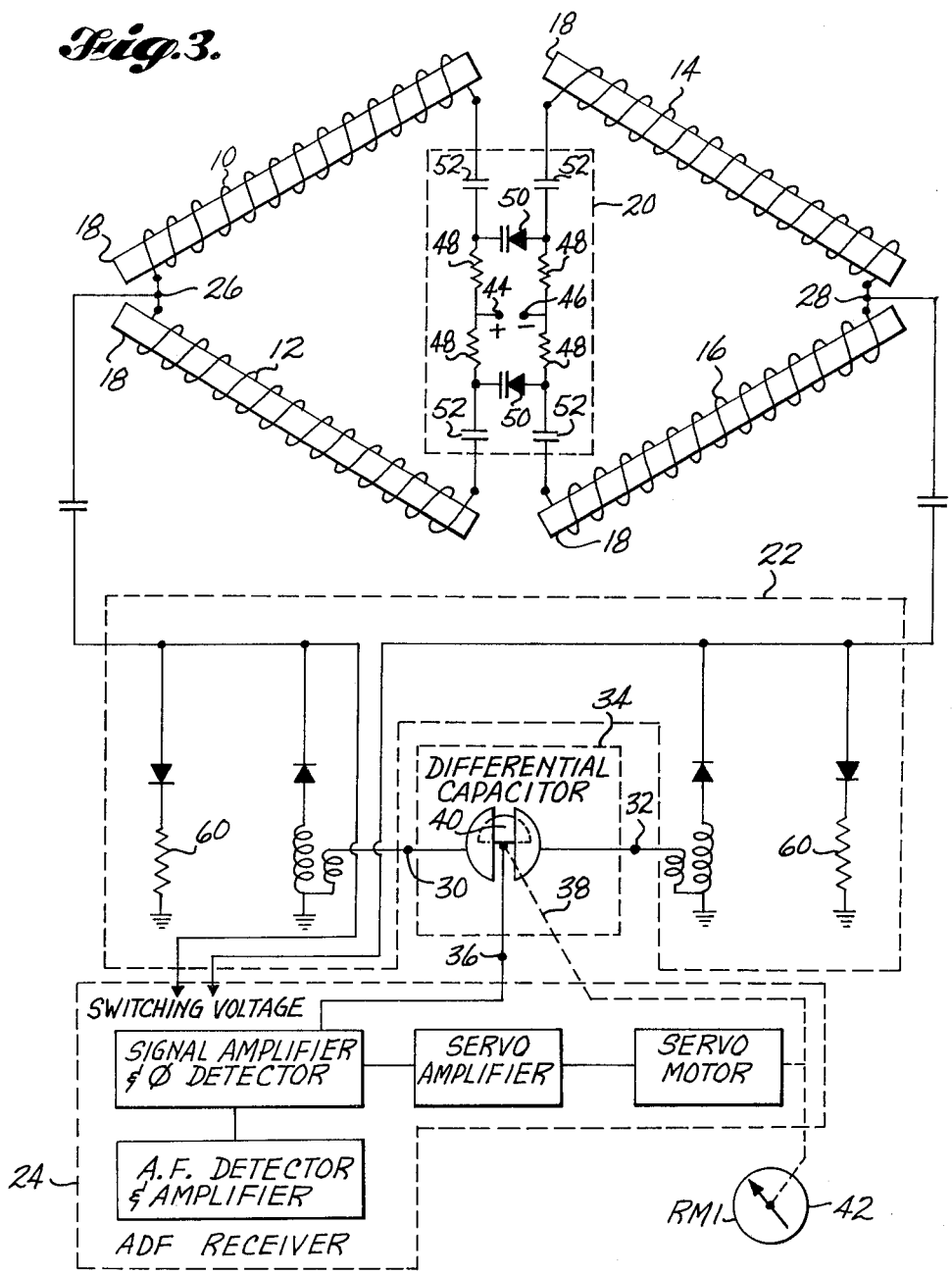

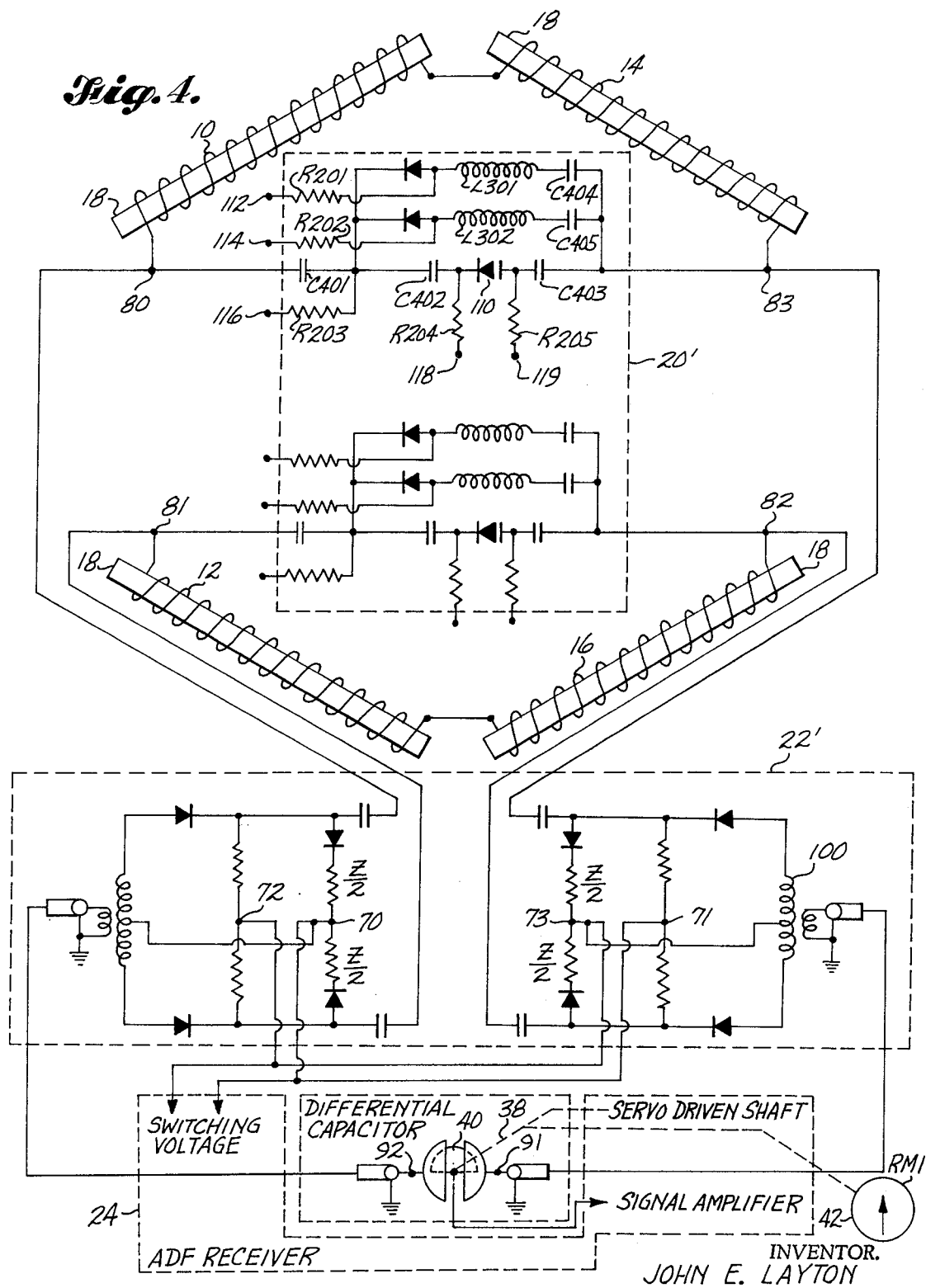

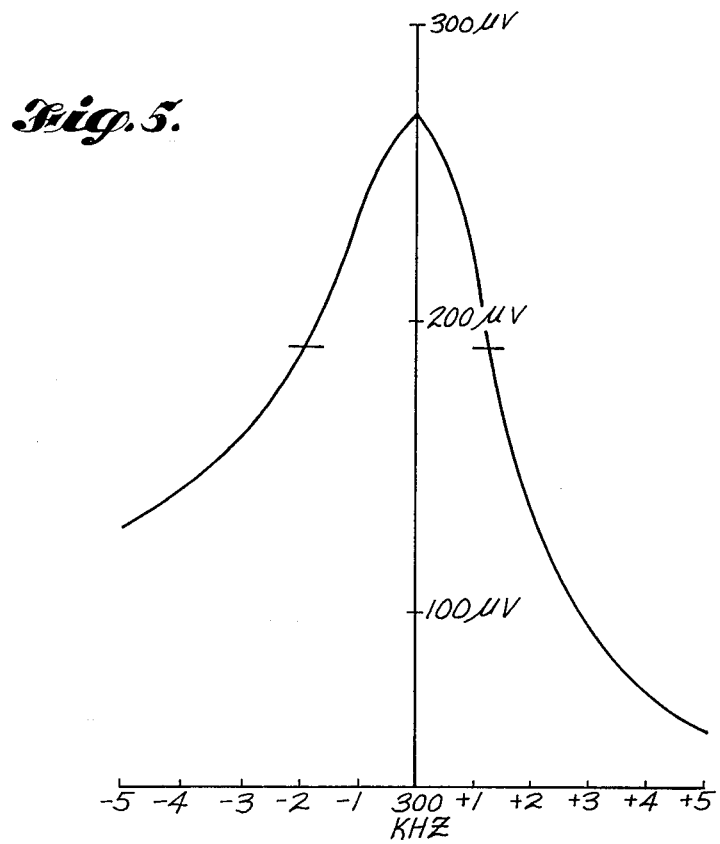

SWITCHED RHOMBIC AUTOMATIC DIRECTION FINDING ANTENNA SYSTEM AND APPARATUS

This invention relates to radio automatic direction finding apparatus and more particularly to antenna arrangements and circuits for tuning and switching these antenna arrangements to satisfy automatic direction finding functions without the utilization of separate sense antennas in these apparatus.

Conventional ADF systems require a sense antenna to produce a constant phase signal which combined with the "figure of eight" bi-phase loop antenna signal provides the means for resolving the ambiguity inherent in bearings obtained using only a loop antenna.

Typical sense antennas offer little or no discrimination to electrostatic interference and, as a consequence, fields produced by the accumulation of precipitation static charges on the antenna and airframe as well as corona discharge are coupled into the ADF receiver essentially unattenuated. The seriousness of this problem can be appreciated when it is recognized that sense antennas on many large aircraft are formed by depositing metallic film on contoured fiberglas panels which are already installed for aerodynamic reasons. The area of these panels can be quite large, ranging on actual production type airplanes from 2,500 to 6,000 square inches. Precipitation static charge build-up on panels of this size together with normal atmospheric noise experienced in the LF/MF (low frequency/medium frequency) spectrum may make ADF systems or apparatus unusable.

In contrast to the flush mounted loop antennas currently utilized in the art, the sense antenna is required to be designed for each new airframe since it is usually an integral part of a fairing or other skin surface which is necessary for aerodynamic or structural reasons. Because of the difficulties arising from problems associated with each new airframe, the location of the sense antenna often must be compromised, and inferior system performance can result when the sense antenna environment becomes noisy. Service range becomes sacrificed and bearing accuracy is degraded.

An attempt to solve the preceding problems affecting system performance introduced by the sense antenna by attempting to derive the sense signal from the outputs of conventional loop antennas would appear to result in failure since the loop antenna patterns do not have the characteristics which lend themselves to such an approach, and, further, their effective capture area is extremely small. In addition, the composite loop signal is at or near zero levels because of the ADF receiver system's goniometer shaft position when the bearing is achieved. At this point, little or no signal would be available for use as a constant phase reference.

Because of these difficulties, it is an object of the present invention to provide an ADF system which eliminates prior art sense antenna shortcomings.

It is another object of this invention to provide an antenna system of novel design which provides the functions now accomplished by the state of the art loop and sense antenna combination.

It is yet another object of this invention to provide a switched rhombic antenna for use in ADF system installations on aircraft, boats, mobile land vehicles, and fixed direction finding stations.

It is yet a further object of this invention to provide means for tuning and lobe-switching a rhombic antenna for use at ADF band frequencies.

It is a further object of this invention to provide a rhombic antenna having large inductance elements would on high permeability material for achieving high effective circuit Q in the antenna.

It is yet another object of this invention to provide a compact tuned rhombic antenna having dimensions that are a small fraction of the wavelength to which the rhombic is tuned.

Figure 2:
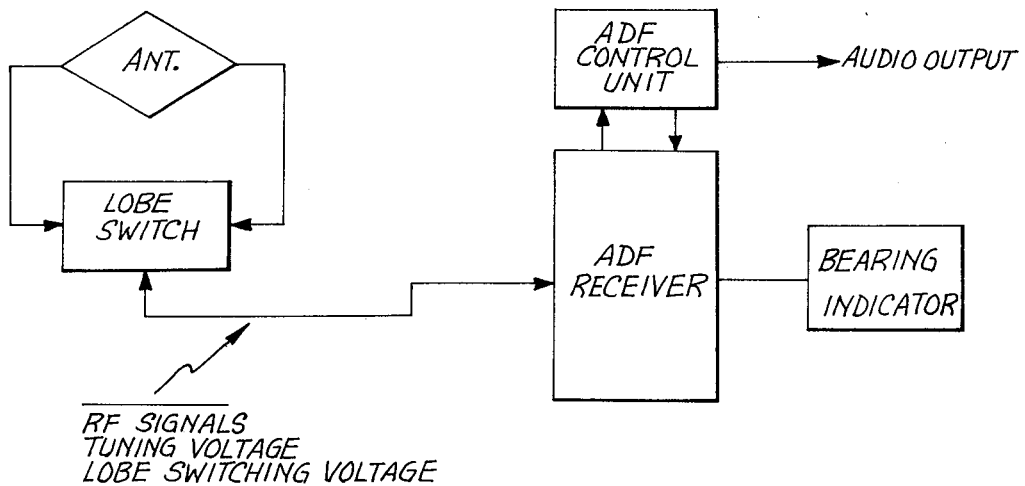

These and other objects of the invention are achieved in a switching and tuning arrangement which couples to an ADF receiving system a rhombic antenna having large inductance elements and operated at resonance. The invention itself, and additional objects and advantages thereof, will best be understood from the following description when read in conjunction with the accompanying drawings in which:

FIG. 1 is a block diagram of a conventional ADF system;
FIG. 2 is a block diagram of an ADF system embodying the principles of the invention;
FIG. 3 is a schematic diagram of a series tuned rhombic antenna in an ADF system in accordance with an embodiment of the present invention;
FIG. 4 is a schematic diagram of a parallel tuned rhombic antenna in an ADF system in accordance with a further embodiment of the present invention;
FIG. 5 is a graph illustrative of Q and bandwidth characteristics of the parallel tuned antenna configuration of FIG. 3 helpful in understanding the nature of the results achieved by this compact rhombic antenna.

Turning now to FIG. 1 of the drawings, there is shown a known ADF system wherein the system components are identified and the signal processing required to satisfy the direction finding function is also indicated. Referring now to FIG. 2, there is shown an ADF system according to the present invention which does not require a separate sense antenna for its operation, yet satisfies all of the requirements specified for ADF systems. In the ADF system embodiments of FIGS. 3 and 4 there is shown an antenna structure of novel design which, in addition to providing all of the functions now accomplished by the conventional loop and sense antenna combination of FIG. 1, eliminates those deteriorations in performance introduced by the sense antenna hereinbefore mentioned and occupies substantially the same space required merely by the former loop antenna alone.

The series tuned rhombic antenna of FIG. 3, and the parallel tuned rhombic antenna of FIG. 4 will be seen to comprise conductors 10, 12, 14, and 16 extending in different directions to form the side legs of a rhombus. Each of conductors 10, 12, 14, and 16 which formed the four-element array in the embodiment test comprised an approximate 200-turn winding of No. 39/44 Litz wire wound on high Q material consisting of ferrite strips 18 manufactured by Indiana General Corp. of Keasbey, N. J., termed Q1 material having a dimension of 3.75 inches by 0.725 inches by 0.125 inches and a specified permeability of 400, with a Curie Point of 662° F. which makes the antenna structure also compatible with elevated skin temperatures of supersonic aircraft. The four-element array forms a structure which is mounted on the surface of the aircraft, e.g., the belly or top of the aircraft, in a depression in the metallic skin thereof. Utilizing the parallel tuned rhombic antenna configuration of FIG. 4, in which the four elements comprising high inductance windings 10, 12, 14, and 16 wound on high permeability cores 18 comprised four type No. 2003 700-microhenry miniature antenna structures manufactured by the Miller Company of Los Angeles, Calif. satisfactory response and operation in all three of the present ADF frequency ranges was achieved. Measurements of the effective height of two commercially available ADF antennas in terms of transverse magnetic field component was found to be 1.4 millimeters and 0.75 millimeters respectively, whereas the present high Q tuned rhombic's effective height was found to be 34.5 millimeters. This measurement while made only at a frequency of 300 KHz, however, is indicative of what may be expected of the present antenna of the higher frequencies in the ADF bands.

An exact appreciation of the importance of the present ADF antenna may be had by reference to the frequency response curve of the parallel tuned rhombic antenna shown in FIG. 5 which indicates a Q of 100 and a bandwidth of 3 KHz. Antenna gain measurements made using a state of the art ADF fixed type antenna having the same dimensions as the rhombic as a reference showed the gain of the tuned rhombic resonated at the test frequency of 300 KHz to be 25 db. Utilization of known full size rhombic antennas at ADF frequencies would, of course, be prohibitive in airborne systems although at UHF or VHF frequencies where a full size rhombic at 200 to 400 MHz is not geometrically large as, for example, in U. S. Pat. No. 2,968,035 to Sirons where free space wavelength varies between 0.75 and 1.5 meters, such antennas have been utilized. The high permeability of cores 18 and the large inductance of the windings 10, 12, 14, and 16 wound thereon makes possible in combination with tuning networks, the achievement of very high effective circuit Q in the antenna at the lower frequencies in the present three ADF bands having frequency ranges 190 to 400 KHz, 400 to 840 KHz, and 840 to 1,750 KHz. Two resulting benefits of significance include the tuned antenna provision of additional and heretofore unachieved additional selectivity in ADF systems; and an improved signal plus noise to noise figure realization as noted previously in the 3 Hz indicated bandwidth.

Increased range, better discrimination against interfering adjacent channel signals and drastic reduction in electrostatic interference in the ADF system result from improved gain and bandwidth properties of the present antenna.

Series tuning of the 4-element rhombic array of FIG. 3 to resonance is achieved by the tuning network 20 which tunes and connects in series conductors 10 and 14, and 12 and 16. A lobe switching network 22 couples the tuned rhombic antenna to ADF receiver 24. Lobe switching network 22 periodically interchanges points 26 and 28 as the feed and terminating points of the antenna, thereby providing the overlapping patterns which yield the signal voltages applied to the stator terminals 30 and 32 of differential capacitor 34. The resulting signal voltages which are applied to stator terminals 30 and 32 differ in amplitude and phase due to the shape of the patterns and the phase reversal which takes place with lobing. These signals provide signals at rotor terminal 36 which when processed in ADF receiver 24 develop servo control through shaft 38 for controlled movement of differential capacitor rotor 40. The larger of the two signal voltages present at stator terminals 30 and 32 causes the ADF receiver 24 servo motor to drive rotor 40 in a direction which results in equal amplitude levels. This action differs in an important respect from that which occurs in the prior art ADF receiver where the servo motor drives the goniometer into a null. In the present ADF system, on either side of the equi-signal shaft position a similar phase reversal occurs which causes the servo to drive the shaft 38 back into the desired equi-signal position. This shaft 38 position is also transmitted to RMI (Radio Magnetic Indicator) 42 as bearing information.

A theoretical study made of bearing errors and assuming perfect cardioid antenna patterns indicated that because of the shape of the cardioid near the null, bearing errors become excessive at approximately plus or minus 60 degrees from the 0 degree - 180 degree heading. It is therefore apparent that the perfect cardioid pattern is not the desired pattern if bearing errors arising from pattern shape are to be minimized. As a consequence, the present ADF system utilizing differential capacitor 34 for coupling the signal voltages derived from lobe switching to the receiver affords the use of variation in capacitor plate shape configurations in addition to modification of antenna geometry to achieve minimum system errors.

Turning now to FIG. 3 and, more specifically, to tuning network 20 in which a tuning voltage from ADF receiver 24 is applied to terminals 44 and 46 having the polarity indicated, the tuning voltage having an amplitude which varies with the frequency to which the receiver is tuned is supplied by means of resistors 48 to varactor diodes 50 whose capacitances vary in a manner to cause series resonance to occur simultaneously and be maintained with changes in frequency in each side of the rhombic between points 26 and 28; viz., in the series circuit path between circuit points 26 and 28 of the system which includes on one side the series connection of a first inductance means comprising conductor 10 spirally wound about core 18, capacitor 52, varactor diode 50, capacitor 52, and a second inductance means comprising conductor 14 spirally wound about core 18, and on the other side between circuit points 26 and 28 which includes conductors 12 and 16. This series tuned configuration is preferable over the FIG. 4 parallel tuned configuration where tuning is desired over a limited range of frequencies, e.g., one ADF band only. Turning now to lobe switching network 22, it will be noted that the switching voltage is obtained from ADF receiver 24, and this switching voltage, sometimes termed "lobe switching" voltage by those skilled in the art, when connected in the present ADF system causes each of circuit points 26 and 28 to become alternately the feedpoint respectively to stator terminals 30 and 32 while the other point is terminated to ground through a terminating resistor 60. Lobe switching is thus achieved at the frequency of the lobe switching signal, normally at an audio rate.

Referring now to FIG. 4 showing tuning network 20' and lobe switching network 22' for the parallel tuned rhombic embodiment, it will be noted that this balanced configuration requires about twice as many components in lobe switching network 22' as was required in the lobing network 22 of the series tuned rhombic configuration of FIG. 3. Lobing is achieved in the switching network 22' by application of the switching voltage obtained from ADF receiver 24 between circuit points 70–71 and 72–73, thereby alternately forward and reverse biasing the diodes connected to circuit points 70 and 72 and between 71 and 73. During the switching half cycle which forward biases the diodes connected to the Z/2 shunt resistors connected to circuit point 70, the end of the antenna comprising terminals 80 and 81 of conductors 10 and 12 is terminated in the impedance Z, and the RF signal developed in the parallel tuned rhombic of FIG. 4 is coupled to stator terminal 91 of the differential capacitor via the forward biased diodes connected to the output transformer primary 100 in the circuit path at the other end of the antenna comprising terminals 82 and 83 of conductors 16 and 14. When the switching voltage waveform reverses polarity, the situation is reversed, i.e., end terminals 80 and 81 now deliver RF developed in the rhombic antenna to differential capacitor stator terminal 92, and the antenna becomes terminated at end terminals 82 and 83 in the impedance Z formed by the two impedances Z/2 connected together at circuit point 73. The received signals are then coupled to rotor 40 of the differential capacitor and then to the signal amplifier and phase detector of the ADF receiver 24 where phase detection takes place, resulting in servo drive signals for the differential capacitor rotor 40 and RMI bearing indicator instrument in the same manner as indicated hereinbefore in the discussion of the FIG. 3 ADF system signal processing.

Proceeding now to the following description of tuning network 20' in which the four elements of the rhombic formed by spiral wound conductors 10, 12, 14, and 16 each comprised 1,400 microhenry inductances, only a description of that portion of tuning network 20' used to tune the upper side of the rhombic loop between terminals 80 and 83 will be detailed, since that portion of tuning network 20' in the lower portion of block 20' connected between points 81 and 82 is identical in mode of operation however tuning the lower half or other side of the rhombic. The upper half of the antenna comprising series-connected elements 10 and 14 is tuned by that portion of tuning network 20' coupled between terminals 80 and 83 which varies the bias voltage on varactor diode 110 from ADF receiver 24 and via terminals 118 and 119. Terminals 112 and 114 are open (no connection) for the 190 to 400 KHz frequency range, terminal 112 is made positive for tuning over the 400 to 840 KHz frequency range, and terminal 114 is made positive when the 840 to 1,750 KHz frequency range is tuned. These control voltages are made available by the control head of the ADF receiver as each ADF band is selected and a control voltage for selecting each band of operation is applied to only one diode at a time. Terminal 116 provides a connection to the negative return lead from the control head band switch.

In the exemplary tuning network 20' of FIG. 4 according to the invention, components and electrical values are as follows:

Resistors:
    R 201                                  0.1 megohms

|  |  |  |
|---|---|---|
|  | R 202 | 0.1 megohms |
|  | R 203 | 0.1 megohms |
|  | R 204 | 1.0 megohms |
|  | R 205 | 1.0 megohms |
| Inductors: |  |  |
|  | L 301 | 820 microhenries |
|  | L 302 | 152 microhenries |
| Capacitors: |  |  |
|  | C 401 | 0.1 microfarads |
|  | C 402 | 0.1 microfarads |
|  | C 403 | 0.1 microfarads |
|  | C 404 | 0.1 microfarads |
|  | C 405 | 0.1 microfarads |

Despite the somewhat greater complexity of the circuitry for the parallel-tuned embodiment shown in FIG. 4, this embodiment can be used throughout the entire range of ADF frequency bands, switching of the elements into the tuning network being accomplished by conventional band switches currently in use, or by the tuning logic of next generation ADF receivers. In contrast, the series tuned configuration of FIG. 3 would be preferable for tuning over a somewhat limited frequency range, e.g., not encompassing the three ADF bands. With currently available voltage variable capacitors utilized in the present design of FIG. 3, a 2 to 1 frequency range is feasible, 190 KHz to 400 KHz being tuned with a control voltage variation of 1.25 volts to 5.5 volts which is well within the linear portion of the variable voltage capacitors characteristic curve.

Proceeding now to a functional description of FIG. 3, in this configuration of the antenna, the series tuned version, both halves of the rhombic comprised of elements 10 and 14 on one side and 12 and 16 on the other are simultaneously maintained at series resonance with varactor diodes 50 and capacitors 52, the latter providing isolation from the DC tuning voltage for elements 10, 14, 12 and 16. The reactance of capacitors 52 is made small with respect to diode capacitors 50 to insure that the tuning function is provided solely by diode capacitors 50. Resistors 48 are made large to confine the RF signals to the tuned antenna elements and to isolate the signal circuits from bias circuitry.

The two halves of the rhombic antenna comprised on one side by ferrite-cored inductances 10 and 14 in series with capacitors 50 and 52, and on the other side by ferrite-cored inductances 12 and 16 in series with capacitors 50 and 52 are joined at points 26 and 28 which are alternatively connected to terminating resistors 60 and to differential capacitor plates 30 and 32 via coupling transformers. Terminating resistors 60 cause the antenna radiation pattern to assume the required cardioid shape which reverses as the lobing signal voltage changes polarity. The lobing voltage insures that when antenna terminal 26 is terminated by resistor 60 via a forward biased diode, the opposite end of the antenna 28 is connected to differential capacitor plate 32 via a coupling transformer by a forward biased diode. Conversely, when the lobing voltage reverses, antenna terminal 28 is connected to terminating resistor 60 by a forward biased diode, and antenna terminal 26 is now connected to differential capacitor plate 30 by a forward biased diode. In the first instance, signals are prevented from reaching differential capacitor 34 by a diode being reverse-biased by the lobing voltage and terminating resistor 60 for antenna terminal 28 is isolated by a reverse-biased diode. In the second instance, signals are prevented from reaching differential capacitor 34 from antenna terminal 28 by a reverse bias on a diode and the terminating resistor 60 for antenna terminal 26 is isolated by a reverse bias on a diode.

Signals reaching the receiver 24 via rotor plate 40 of differential capacitor 34 will differ in amplitude and phase by virtue of the level changes caused by the overlapping cardioid antenna patterns, and will appear as a modulated waveform, the levels changing at the lobing frequency. The same lobing signal is applied to the phase detector in the receiver where the differing amplitude and phase develop control voltage for the servo motor causing it to turn differential capacitor 34 shaft 38 in such a direction as to equalize the two signal levels coupled to rotor 40 from fixed plates 30 and 32. Drive signals from the phase detector will cease when this position of the rotor shaft is reached and the Radio Magnetic Indicator (RMI) 42 whose drive shaft is coupled to the servo motor will indicate the magnetic bearing relative to aircraft heading from which the signal is being received.

Turning now to a functional description of FIG. 4, it will be observed that this configuration of the antenna is the parallel tuned version and is comprised basically of series connected elements 10 and 14 on one side of the array which are in parallel with series connected capacitors C-401, C-402, C-403 and varactor diode 110. On the other side of the array series connected elements 12 and 16 are similarly parallel connected with identical capacitors and varactor diode 110. Reactance of capacitors C-401, C-402 and C-403 is made negligible with respect to that of varactor diode 110 to insure its effectiveness as the principal tuning element. Capacitors C-402 and C-403 isolate the tuned circuit from the DC tuning voltages on varactor diode 110. Likewise resistors R-204 and R-205 are made large to confine the RF signals to the tuned circuits in each half of the antenna. Diodes 110 are matched and are simultaneously biased via resistors R-204 and R-205 so as to maintain parallel resonance in both halves of the antenna. Tuning voltage is applied at terminals 118 and 119. Lobing voltage obtained from the receiver 24 alternately forward and reverse bias diodes associated with the terminating resistors at points 70 and 73, and the coupling transformers 100 in the following manner. When points 70 and 71 are positive with respect to points 72 and 73 the right end of the antenna, i.e., points 82 and 83, becomes terminated by resistors Z/2 via the associated forward biased diodes. Likewise, the left end of the antenna, i.e., points 80 and 81, becomes terminated by the coupling transformer 100 via the forward biased diodes, and the RF signal is coupled to the receiver 24 via terminal 92 and rotor 40 of differential capacitor 34. Reverse biased diodes associated with terminating resistors Z/2 in the left hand network isolate them from the circuit, and the reverse biased diodes associated with coupling transformer 100 in the right hand network isolate it from differential capacitor 34. With reversal of the lobing voltage, right hand end of the antenna, i.e., points 82 and 83, is coupled to transformer 100 by forward biased diodes, and the left end of the antenna, i.e., points 80 and 81 is terminated by resistors Z/2 at point 72 by forward biased diodes. Left hand coupling transformer 100 is isolated from the circuit by reverse biased diodes and the terminating resistors Z/2 at point 73 are isolated from the associated network by reverse biased diodes. RF signals are thereby coupled via right hand transformer 100 to receiver 24 via terminal 91 and rotor 40 of differential capacitor 34.

The lobing voltage accomplishes the alternate terminating and receiving functions of the antenna as described previously for the series tuned version shown in FIG. 3.

In order to tune the antenna throughout the complete ADF band of frequencies, i.e., from 190 KHz through 1,750 KHz, inductances L-301 and L-302 are caused to be in parallel with series elements 10 and 14 and varactor diode 110 on one side of the antenna and with series elements 12 and 16 and the varactor diode associated with that side of the antenna by forward biasing the diode via R-201, or the other diode via R-202. With neither L-301 nor L-302 in the circuit, i.e., diodes reverse biased, the bias voltage range for varactor diode 110 tunes each half of the antenna to resonance in the frequency range 190 KHz to 400 KHz. With a diode forward biased, inductor L-301 is placed in parallel with elements 10 and 14 on one side and similar inductor L-301 on the other side of the antenna is placed in parallel with elements 12 and 16 by a forward biased diode. The resulting inductance in each half of the antenna is thereby reduced to such a value that the tuning voltage range for varactor diode 110 now resonates each half of the antenna in the frequency range of 400 KHz to 840 KHz. With diodes associated with inductances L-301 reverse biased, and diodes forward biased via resistors R-202, inductances L-302 are placed in parallel with their associated antenna halves and the varactor diode 110 tuning voltage resonates the antenna in the frequency range of 840 KHz to 1,750 KHz. Diodes are isolated from the switching voltage source by individual resistors R-201 and R-202 as well as the common return resistor R-203, all of which are made large so as to confine signal voltages to the tuned circuits. Capacitors C-401 and C-402 prevent the switching voltages for diodes from influencing the tuning varactor diodes 110 while providing a complete path for the RF currents in the tuned circuits. Capacitors C-401 are made large for this reason.

Reference to FIG. 5 shows a realized Q and bandwidth of 100 and 3 KHz respectively. While this data has not been taken on the series of configuration, the response of the series configuration during screen room tests indicates it is equal to or superior to the parallel configuration in respect to these parameters. Varactor tuning in the disclosed embodiments proved effective and tracking using I. T. T. type BA-163 type diodes in the circuits shown operated satisfactorily though matched pairs were utilized.

In FIG. 5, besides the previously noted Q of nearly 100 at 300 KHz, it should also be observed that the gain with respect to the half-power points 501 and 502 is slightly over 28 db.

While in the preceding description of embodiments of the invention exemplary circuit means and connections as well as specific electrical values have been set forth by way of example, it will be evident to those skilled in the art that in the light of the present disclosure variations may be made without departing from the true spirit and scope of the invention and without exercise of more than ordinary skill in the art. Accordingly, it is not desired that the invention be restricted to the exemplary details, other than is required by the recitations of the appended claims.

I claim:

1. A rhombic antenna array having feed and terminating points for use in a selected frequency band comprising:
   first, second, third, and fourth elements having dimensions that are a small fraction of the smallest wavelength in the selected frequency band,
   said first, second, third, and fourth elements each comprising helically wound conductor members on ferrite cores,
   tuning network means coupled to said first, second, third, and fourth elements for tuning said antenna to a substantially resonant condition between said feed and terminating points,
   said tuning network means comprising a first varactor diode and first and second capacitors connected in series between said first and second elements.

2. A rhombic antenna array having feed and terminating points for use in a selected frequency band comprising:
   first, second, third, and fourth elements having dimensions that are a small fraction of the smallest wavelength in the selected frequency band,
   said first, second, third, and fourth elements each comprising helically wound conductor members on ferrite cores,
   tuning network means coupled to said first, second, third, and fourth elements for tuning said antenna to a substantially resonant condition between said feed and terminating points,
   said tuning network means comprising a first varactor diode and first and second capacitors connected in series between said first and second elements,
   said tuning network means further comprising a second varactor diode and third and fourth capacitors connected in series between said third and fourth elements.

3. In an automatic direction finding system, the combination of:
   an automatic direction finder receiver,
   a four element rhombic antenna having feed and terminating points, each of said elements comprising helically wound conductor members on ferrite cores,
   tuning network means coupled to said rhombic antenna,
   lobe switching network means operating to periodically interchange the feed and terminating points of the antenna,
   differential capacitor means coupled between said lobe switching means and said automatic direction finding receiver,
   said differential capacitor having first and second stator plates coupled respectively to said feed and terminating points of said four element rhombic antenna, and a rotor plate,
   said automatic direction finder receiver comprising signal processing means including signal amplifier and phase detector means coupled to said rotor plate for developing servo control for controlled movement of said differential capacitor rotor.

4. A rhombic antenna array having feed and terminating points for coupling to a variable frequency receiver providing a tuning voltage having an amplitude which varies with the frequency to which the receiver is tuned comprising:
   first, second, third, and fourth elements having dimensions that are a small fraction of the smallest wavelength in the selected frequency band,
   said first, second, third, and fourth elements each comprising helically wound conductor members on ferrite cores,
   tuning network means coupled to said first, second, third, and fourth elements for tuning said antenna to a substantially resonant condition between said feed and terminating points,
   said tuning network means comprising variable voltage capacitor means responsive to said tuning voltage for achieving and maintaining said substantially resonant condition with changes in frequency of said receiver.

5. In an automatic direction finding system, the combination of:
   a four element rhombic antenna having feed and terminating points, each of said elements comprising helically wound conductor members on ferrite cores,
   tuning network means coupled to each of said four elements for tuning said antenna to a substantially resonant condition between said feed and terminating points,
   lobe switching network means operating to periodically interchange the feed and terminating points of the antenna,
   an automatic direction finder receiver and means including a servo driven capacitor rotor shaft coupled between said lobe switching network means and said automatic direction finding receiver for providing bearing information dependent upon said shaft position.

6. In an automatic direction finding system, the combination of:
   a four element rhombic antenna for providing a cardioid type pattern and having feed and terminating points, each of said elements comprising helically wound conductor members on ferrite cores,
   tuning network means coupled to each of said four elements for tuning said antenna to a substantially resonant condition between said feed and terminating points,
   lobe switching network means operating to periodically interchange the feed and terminating points of the antenna,
   an automatic direction finder receiver, and
   differential capacitor means for coupling signal voltages derived from lobe switching to said receiver.

7. In combination:
   a four element rhombic antenna having feed and terminating points, each of said elements comprising helically wound conductor members on ferrite cores,
   lobe switching network means operating to periodically interchange the feed and terminating points of the antenna,
   an automatic direction finder receiver comprising signal amplifier and phase detector means, and
   differential capacitor means comprising first and second stator terminals and a rotor, said lobe switching means coupling the feed point to said first or second stator terminals, and said rotor coupled to said signal amplifier and phase detector.

8. An automatic direction finder receiver antenna for mounting on the surface of an aircraft comprising:

a four element rhombic antenna array, each of said elements comprising helically wound conductor members on ferrite cores, voltage controlled tuning means including first capacitor means for tuning two of said elements to resonance and second capacitor means for tuning the remaining two of said elements to resonance.

* * * * *